(12) United States Patent
Oguma (10) Patent No.: US 10,175,664 B2
(45) Date of Patent: Jan. 8, 2019

(54) SENSOR INFORMATION COMPLEMENTING SYSTEM AND SENSOR INFORMATION COMPLEMENTING METHOD

(75) Inventor: Hisashi Oguma, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1277 days.

(21) Appl. No.: 14/122,184

(22) PCT Filed: May 30, 2012

(86) PCT No.: PCT/JP2012/063972
§ 371 (c)(1),
(2), (4) Date: Nov. 25, 2013

(87) PCT Pub. No.: WO2012/165496
PCT Pub. Date: Dec. 6, 2012

(65) Prior Publication Data
US 2014/0107812 A1    Apr. 17, 2014

(30) Foreign Application Priority Data

May 31, 2011    (JP) .................................. 2011-122229

(51) Int. Cl.
| G05B 15/02 | (2006.01) |
| G01D 1/16 | (2006.01) |
| G01D 3/10 | (2006.01) |

(52) U.S. Cl.
CPC ............... *G05B 15/02* (2013.01); *G01D 1/16* (2013.01); *G01D 3/10* (2013.01)

(58) Field of Classification Search
CPC ......... G05B 15/02; A61B 5/0024; G06F 1/00; G06F 17/16; G01S 2205/00; G01S 2205/001; G01S 5/021; G01S 19/48; G01D 3/10; G01D 1/16
USPC ......................... 702/188, 189, 104, 127, 181
See application file for complete search history.

(56) References Cited

U.S. PATENT DOCUMENTS

| 4,649,506 | A | * | 3/1987 | Van den Heuvel ...... G09G 1/08 |
| | | | | 315/367 |
| 5,229,301 | A | * | 7/1993 | Spira-Solomon ........................... |
| | | | | G01N 33/54373 |
| | | | | 436/501 |
| 5,793,230 | A | * | 8/1998 | Chu ....................... H03K 5/007 |
| | | | | 327/307 |
| 6,338,011 | B1 | * | 1/2002 | Furst ....................... G01S 7/003 |
| | | | | 342/159 |

(Continued)

FOREIGN PATENT DOCUMENTS

JP    A-2002-215646    8/2002

*Primary Examiner* — Jeffrey Aiello
(74) *Attorney, Agent, or Firm* — Oliff PLC (57) ABSTRACT

Sensor information is regularly acquired from a plurality of sensors and stored. For each of the sensors, other sensors whose information is correlated are selected. When sensor information of a sensor is requested from an application program or the like, while if the requested sensor is available the sensor information is acquired directly from the sensor, if the requested sensor is unavailable the sensor information of sensors relevant to the sensor is acquired and the sensor information of the requested sensor is estimated. As a result, in a system comprising a plurality of sensors, sensor information of an unavailable sensor will be estimated in a short period of time.

10 Claims, 11 Drawing Sheets

(56) References Cited

U.S. PATENT DOCUMENTS

| | | | |
|---|---|---|---|
| 7,526,944 B2* | 5/2009 | Sabata | G01N 17/00 |
| | | | 702/113 |
| 2006/0026118 A1* | 2/2006 | Jung | G06F 17/30241 |
| 2006/0026164 A1* | 2/2006 | Jung | G01D 9/005 |
| 2007/0001898 A1* | 1/2007 | Twitchell, Jr. | G01S 19/07 |
| | | | 342/357.4 |
| 2007/0004331 A1* | 1/2007 | Twitchell, Jr. | G01S 19/03 |
| | | | 455/1 |
| 2007/0067742 A1* | 3/2007 | Takaoka | H04L 12/2602 |
| | | | 715/850 |
| 2008/0162088 A1* | 7/2008 | DeVaul | A61B 5/0024 |
| | | | 702/190 |
| 2008/0167833 A1* | 7/2008 | Matsen | G01N 29/14 |
| | | | 702/122 |
| 2011/0055481 A1* | 3/2011 | Murakami | G06F 12/0875 |
| | | | 711/118 |
| 2012/0232430 A1* | 9/2012 | Boissy | A61B 5/1118 |
| | | | 600/595 |
| 2012/0253480 A1* | 10/2012 | Abe | G08C 17/02 |
| | | | 700/12 |

* cited by examiner

SENSOR INFORMATION COMPLEMENTING SYSTEM AND SENSOR INFORMATION COMPLEMENTING METHOD

TECHNICAL FIELD

The present invention relates to a technique used in a system having a plurality of sensors, for estimating information of a specific sensor when that sensor is not available, by utilizing information of other sensors.

BACKGROUND ART

A vehicle system uses a multitude of sensors and performs various kinds of processing based on the information obtained from the sensors. When some of the sensors are not available in such a system, missing data is estimated based on the data of available sensors. In Patent Document 1, for example, missing data is estimated from stored similar data by utilizing a Manhattan distance formula.

CITATION LIST

Patent Literature

Patent Literature 1: Japanese Patent Application Laid-open No. 2002-215646

SUMMARY OF INVENTION

Technical Problem

However, a system configured with multiple sensors contains a large amount of sensor data necessary for complementing missing data, so that it takes a significant time for real-time sensor data collection and data estimation. Therefore, the above approach is not appropriate for complementing missing data in a system where immediate responsiveness is required.

An object of the present invention is to provide a technique that enables quick estimation of sensor data of an unavailable sensor in a system having a plurality of sensors.

Technical Solution

The sensor information complementing system of the present invention includes a plurality of sensors, sensor control means, storage means, relevant sensor selecting means, sensor information estimating means, and sensor information acquiring means. The sensor control means has a function of acquiring sensor information (sensor data) from the plurality of sensors. The storage means stores sensor information acquired regularly from the plurality of sensors. The relevant sensor selecting means selects sensors whose information is correlated to a particular sensor, based on the sensor information stored in the storage means. The relevant sensor selecting means preferably specifies relevant sensors for each of the plurality of sensors. The sensor information estimating means has a function of estimating information of a specific sensor by acquiring information of other sensors correlated to this specific sensor. When information of a sensor is requested, if that sensor is available, the sensor information acquiring means acquires the information from this sensor, and if the sensor is not available, acquires estimated information of this sensor from the sensor information estimating means.

According to the sensor information complementing system of the present invention, relevant sensors are selected for each of the sensors, and information is estimated based on the information of the relevant sensors, so that the amount of data necessary for the estimation is reduced. As a result, the time required for the estimation is shortened. Another advantage is that estimation is made with good precision since information of irrelevant sensors is not used for the estimation.

The sensor information complementing system of the present invention may be installed in one node (Electronic Control Unit (ECU), or computer), or may be installed as a system configured by a plurality of nodes. As one embodiment of installing the sensor information complementing system of the present invention in a plurality of nodes, the system may be configured by a plurality of nodes each including at least one sensor, sensor control means, storage means, relevant sensor selecting means, sensor information estimating means, sensor information acquiring means, and coordination means. The coordination means is a functional unit that acquires sensor information of other nodes or provides sensor information of its own node to other nodes. Each node acquires information of sensors belonging to its own node regularly and provides the acquired information to other nodes via the coordination means. Each node can thus regularly acquire sensor information and store the information in the storage means with respect to the sensors belonging to its own node and sensors belonging to other nodes. The relevant sensor selecting means can thus select sensors relevant to a sensor based on the stored sensor information. The relevant sensor selecting means of each node need not select relevant sensors with respect to all the sensors, but may select relevant sensors only with respect to the sensors belonging to its own node. When estimating information of a specific sensor, if other sensors correlated to this sensor belong to other nodes, the sensor information estimating means should preferably acquire sensor information via the coordination means to estimate the information.

In another embodiment of the present invention, selection of relevant sensors and estimation of sensor information may collectively be made in a dedicated node. Namely, the sensor information complementing system of the present invention may be configured by a plurality of nodes each including at least one sensor, sensor control means, sensor information acquiring means, and coordination means, and a management node including storage means, relevant sensor selecting means, sensor information estimating means, and coordination means. The sensor control means should preferably include a coordination unit that acquires sensor information of its own node and exchanges sensor information with other nodes and the management node. The plurality of nodes each regularly acquire sensor information of their own nodes and provide the information to the management node via the coordination unit. Thus the storage means of the management node stores sensor information that is regularly acquired. In the management node, preferably, the relevant sensor selecting means selects relevant sensors, and information of a specific sensor is estimated based on sensor information acquired from a node that has sensors relevant to this sensor.

If the sensor information complementing system of the present invention is configured by a plurality of nodes, there may be various ways other than the example described above of assigning processing functions to respective nodes. A person skilled in the art would readily make various modifications without departing from the spirit of the present invention.

The relevant sensor selecting means of the present invention may select sensors relevant to a given sensor in the following manner. First, based on the stored information of a target sensor, the selecting means determines a first starting time and a first ending time such that sensor values of the target sensor monotonically increase or decrease during that period. It then determines a time point at which the sensor value of the target sensor equals to the sensor value at the first starting time as a candidate for a second starting time, and determines a time point at which the sensor value equals to the sensor value at the first ending time as a candidate for a second ending time. It then determines a second starting time and a second ending time from the second starting time candidates and the second ending time candidates such that difference over time between the second starting time and the second ending time is the same as that between the first starting time and the first ending time (second ending time−second starting time=first ending time−first starting time). A plurality of combinations of the second starting time and second ending time may be selected, or only one pair may be selected. Next, if the sensor values of a sensor other than the target sensor at the first starting time and at the second starting time are equal and if the sensor values at the first ending time and at the second ending time are equal, this sensor can be determined to be correlated to the target sensor. When determining the second starting time and the second ending time, the precision can be made even higher by adopting another condition that the waveform of sensor information during that period is the same as the waveform between the first starting time and the first ending time.

This way, a relevant sensor can be identified with a relatively simple process, so that processing load can be reduced. The method of selecting relevant sensors is not limited to the one described above, and various other techniques such as those that use correlation coefficients may be employed.

The present invention may be understood as a sensor information complementing system including at least part of the means described above. The invention can also be understood as a method of complementing sensor information that involves these processes, or as a program for implementing the method on a computer. The present invention can be configured by combining the means and processes described above in various possible ways.

Advantageous Effects of Invention

According to the present invention, sensor information of an unavailable sensor can be estimated in a short time in a system having a plurality of sensors.

DESCRIPTION OF EMBODIMENTS

First Embodiment

[General Configuration of the System]

Figure 1:
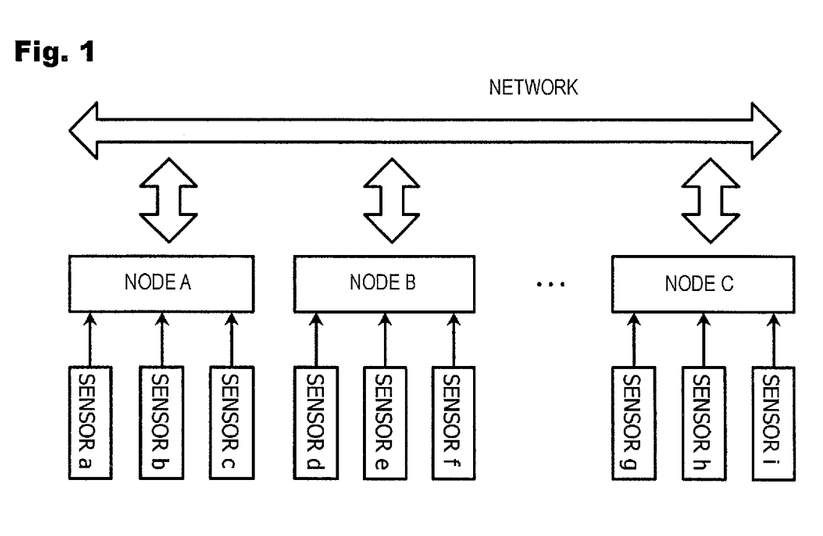
FIG. 1 is a diagram illustrating the general configuration of a data complementing system according to one embodiment.

The general configuration of a data complementing system (sensor information complementing system) according to this embodiment will be described with reference to FIG. 1 and FIG. 2. As shown in FIG. 1, this system is configured with a plurality of nodes or electronic control units (ECUs) interconnected via a network. Each node is connected to a sensor and capable of obtaining sensor information from the sensor. Each node uses not just the information from its own sensor but obtains information also from the sensors connected to other nodes and uses it for the processing.

Figure 2:
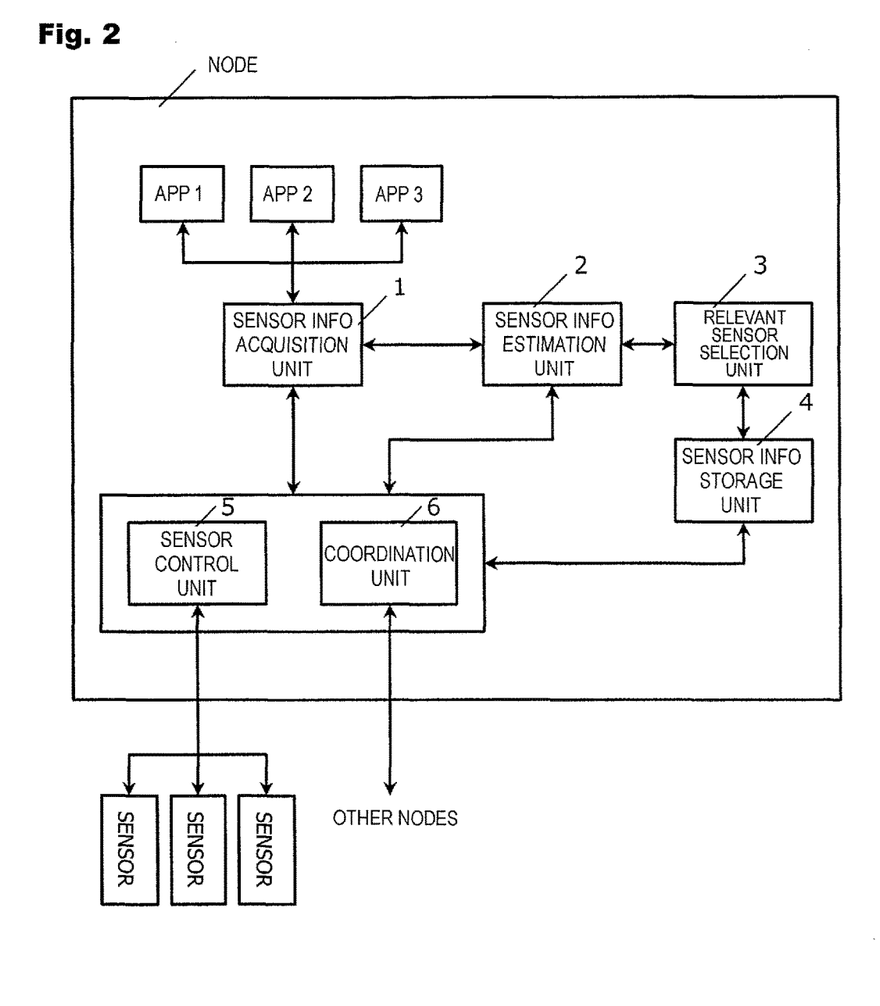
FIG. 2 is a diagram illustrating functional blocks of respective nodes.

FIG. 2 is a diagram illustrating functional blocks of respective nodes. Each node includes a sensor information acquisition unit 1, a sensor information estimation unit 2, a relevant sensor selection unit 3, a sensor information storage unit 4, a sensor control unit 5, and a coordination unit 6 as its functional units. These functional units are realized by a processor (CPU or MPU) running a program stored in a supplementary storage device (various types of ROMs, HDDs, SSDs, and the like).

The sensor control unit 5 is a functional unit that acquires current sensor information from a sensor connected to its own node, or sends instructions to the sensor. The sensor control unit 5 regularly acquires sensor information and stores the information in the sensor information storage unit 4 and provides the acquired sensor information to other nodes via the coordination unit 6. The sensor control unit 5 also acquires sensor information at suitable timing in response to a request from the sensor information acquisition unit 1.

The coordination unit 6 exchanges sensor information and other data with other nodes. More specifically, it provides information of the sensor connected to its own node to other nodes, or requests information of sensors connected to other nodes. When the coordination unit 6 receives a request from another node for information of a sensor connected to its own node, it acquires the information of that sensor from the sensor control unit 5 and sends it back to the requesting node.

The sensor information storage unit 4 stores information of sensors connected to its own node and information of sensors connected to other nodes. Information of sensors connected to its own node is provided by the sensor control unit 5, and information of sensors connected to other nodes is regularly provided to the sensor information storage unit 4 via the coordination unit 6. Thus information of all the sensors in this system is regularly acquired and stored in the sensor information storage unit 4. If information of a sensor fails to be provided, the sensor information storage unit 4 can recognize that this sensor is not available.

The relevant sensor selection unit 3 selects sensors relevant to a particular sensor based on the sensor information stored in the sensor information storage unit 4. There may only be one relevant sensor, or two or more relevant sensors. "Relevant" here means that sensors' information is correlated to each other so that, even if information of one sensor cannot be obtained, the information of this sensor can be estimated from the information of the other relevant sensor. When one sensor is unavailable (information of that sensor cannot be obtained), relevant sensors are used to estimate the information of this unavailable sensor. Specific methods of selecting relevant sensors will be described later in detail.

The sensor information acquisition unit 1 is a functional unit that acquires sensor information in response to a request from an application program or the coordination unit 6. If the sensor whose information is requested is connected to its own node, the sensor information acquisition unit acquires the information of that sensor from the sensor control unit 5. If the sensor whose information is requested from an application program is connected to other node, the unit acquires the information of that sensor via the coordination unit 6. If the sensor whose information is requested (that is connected to its own node) is operating properly, the unit can acquire the sensor information from the sensor control unit 5. However, if that sensor is unavailable, the unit cannot directly acquire the sensor information. In this case, the unit acquires estimated sensor information from the sensor information estimation unit 2.

The sensor information estimation unit 2 estimates current sensor values of a sensor based on the information of other sensors relevant to that sensor. Which sensors are relevant to the sensor of its own node has already been determined by the relevant sensor selection unit 3. The sensor information estimation unit 2 therefore acquires information of other sensors relevant to the sensor whose information is requested from the sensor control unit 5 (if the sensor is connected to its own node) or the coordination unit 6 (if the sensor is connected to other node) to estimate the requested information of the sensor. The estimation method will be described later in detail.

[Operation]

1. Sensor Information Collection Process

Figure 3:
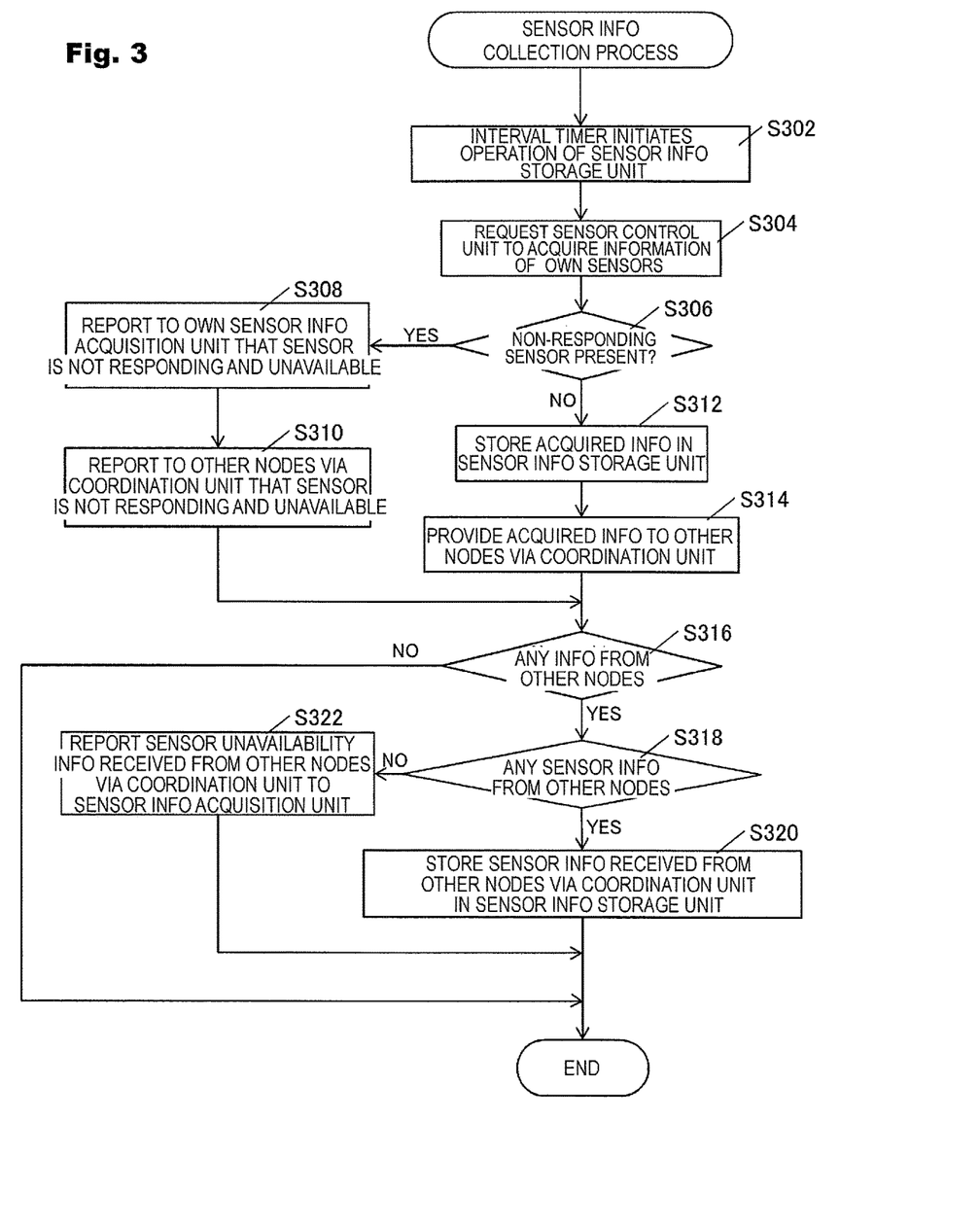
FIG. 3 is a flowchart of a regularly performed sensor information collection process.

Hereinafter, the sensor information collection process that is performed regularly will be described with reference to FIG. 3.

The sensor information collection process is executed regularly with the use of an interval timer (S302). Sensor information should preferably be collected at the same time in the entire system. To do this, the nodes require time synchronization, which can be achieved by using a system such as NTP (Network Time Protocol). Once the sensor information collection process starts, the sensor information storage unit 4 requests the sensor control unit 5 to acquire information from sensors (S304). The sensor control unit 5 tries to acquire information from sensors, and, if there is a sensor that does not respond (S306: YES), reports to the sensor information acquisition unit 1 of its own node that the sensor is not responding and unavailable (S308). The sensor control unit 5 also reports to other nodes via the coordination unit 6 that the sensor is not responding and unavailable (S310). The coordination units 6 of other nodes that have received this information provide it to their sensor information acquisition units 1. Thus sensor information acquisition units 1 can recognize which of all the sensors within the system are unavailable.

If the sensor control unit 5 has successfully acquired information from the sensor (S306: NO), it stores the acquired sensor information in the sensor information storage unit 4 (S312). The acquired information is provided also to other nodes via the coordination unit 6 (S314).

If information is received from other node via the coordination unit 6 (S316: YES), and if it includes sensor information (S318: YES), then this received sensor information is stored in the sensor information storage unit 4 (S320). If, on the other hand, the information received via the coordination unit 6 indicates that a sensor is unavailable (S318: NO), then it is reported to the sensor information acquisition unit 1 of its own node that the sensor is unavailable.

Thus information of all the sensors in the system is acquired and stored in the sensor information storage units 4 of respective nodes. Even if there are unavailable sensors, this is known to the sensor information acquisition units 1 of respective nodes.

2. Relevant Sensor Selection Process

Figure 4:
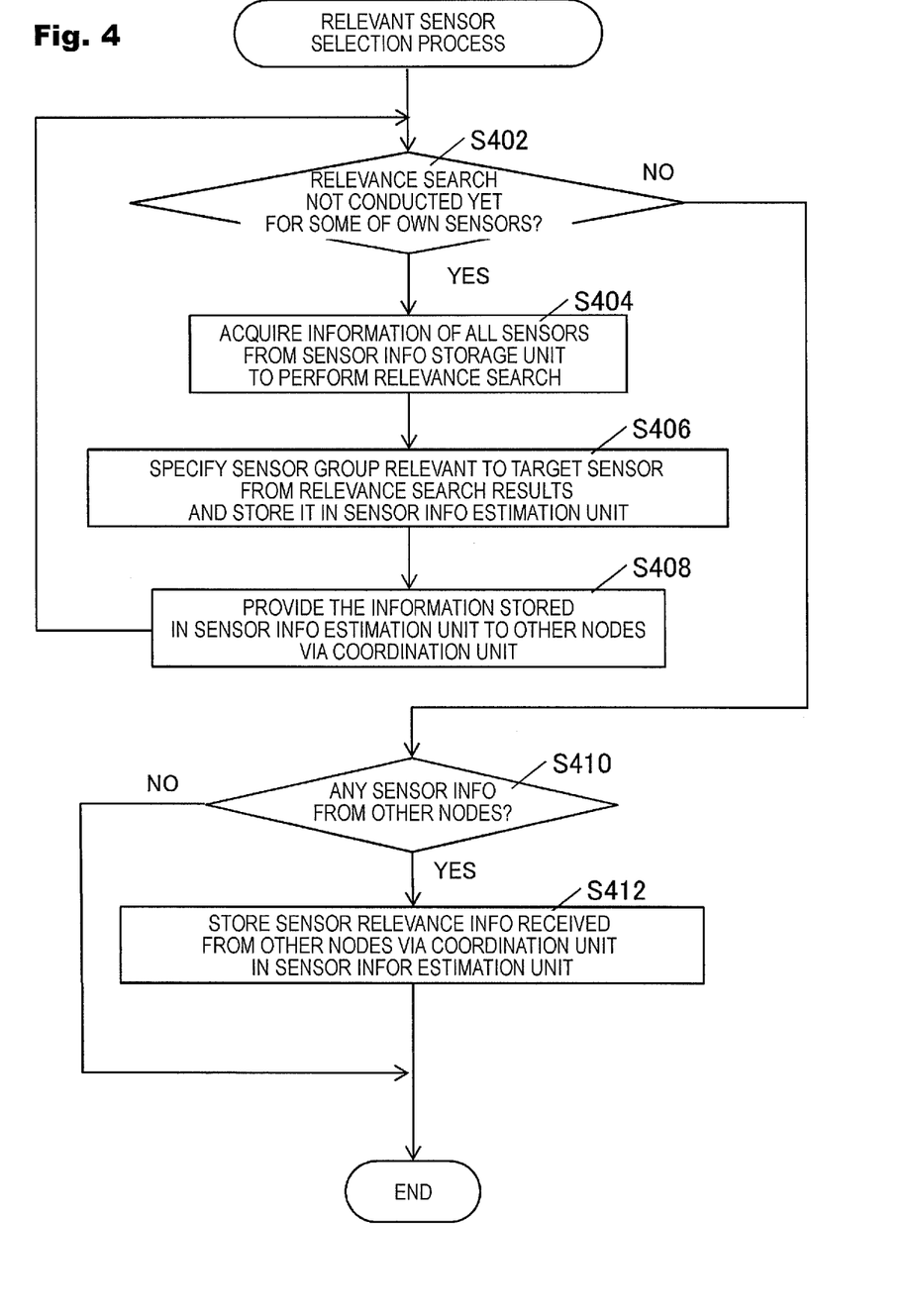
FIG. 4 is a flowchart of relevant sensor selection process in which relevant sensors are selected.

Next, the process of selecting relevant sensors will be described with reference to FIG. 4. This process may be performed successively after the sensor information collection process that is regularly executed, or, it may be carried out at longer intervals. Alternatively, instead of being executed regularly, the process may be performed on an on-demand basis.

The relevant sensor selection unit 3 selects sensors relevant to sensors belonging to its own node. It is preferable to determine which sensors are relevant with respect to all of the sensors that belong to the own node. If there is a sensor for which estimation of missing data is not required, it is not necessary to determine which sensors are relevant to that sensor.

The relevant sensor selection unit 3 first refers to the sensor information storage unit 4, and selects relevant sensors with respect to one of the sensors belonging to its own node based on the information of all the sensors in the system (S404). Only one relevant sensor may be determined, or two or more relevant sensors may be determined.

Figure 5:
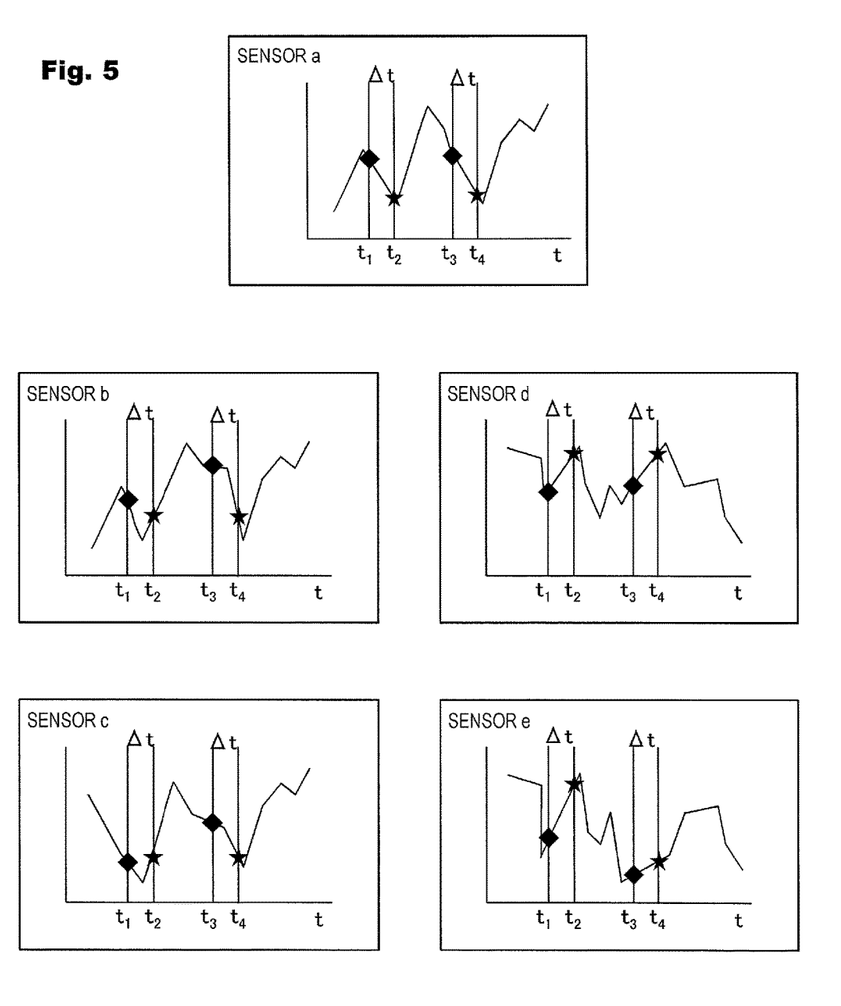
FIG. 5 is a schematic diagram showing sensor information stored in a sensor information storage unit.
Figure 6:
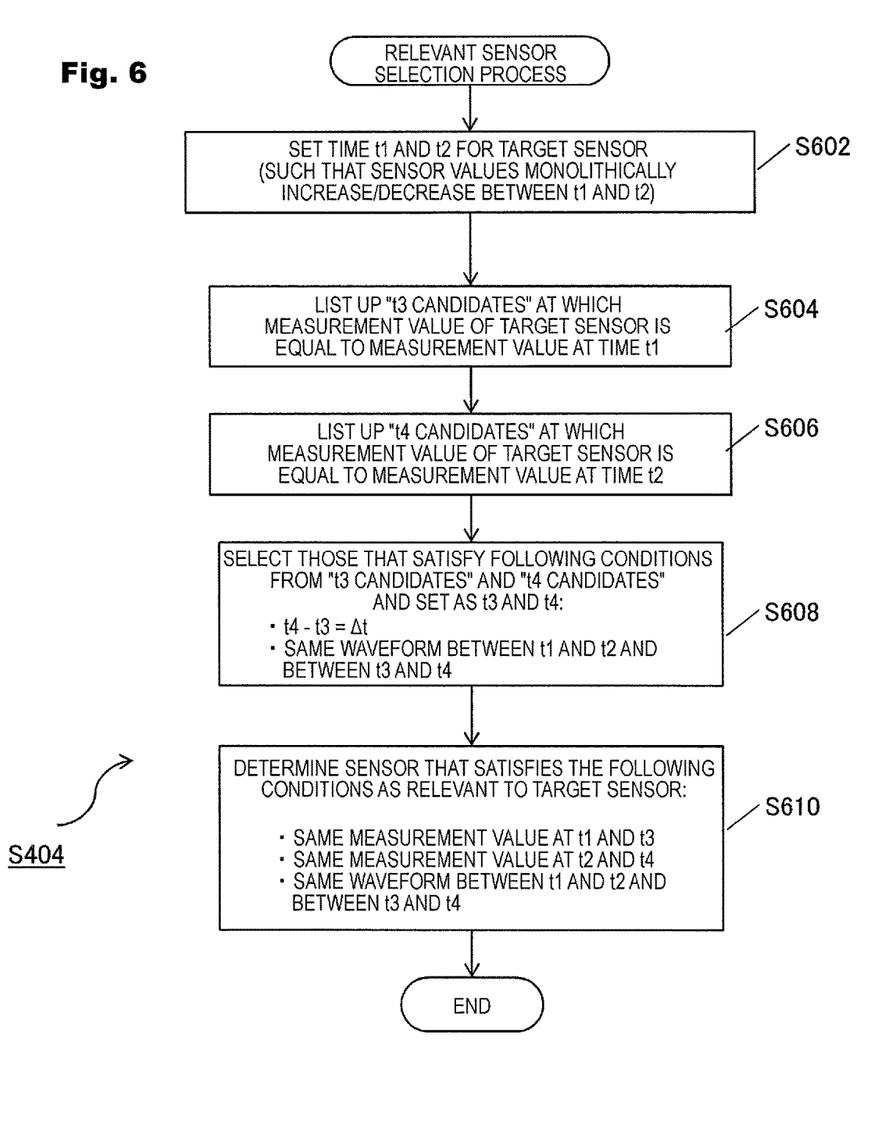
FIG. 6 is a flowchart of a specific process for selecting relevant sensors.

The method of selecting sensors relevant to a specific sensor will be described with reference to FIG. 5 and FIG. 6. How a sensor relevant to sensor a is selected will be explained as one example here. FIG. 5 is a schematic diagram illustrating information of each sensor stored in the sensor information storage unit 4. FIG. 6 is a flowchart showing the process performed by the relevant sensor selection unit 3.

The relevant sensor selection unit 3 first refers to the stored information of sensor a (hereinafter, a sensor for which it is determined which sensors are relevant thereto will be referred to also as "target sensor"), and determines time t1 (first starting time) and time t2 (first ending time) such that measurement values of sensor a monotonically increase or decrease during the period between t1 and t2 (S602). Time t1 and time t2 may be determined in any specific way. For example, a given time point may be determined as time t1 first, after which a maximum time point may be determined as time t2 such that the measurement values monotonically increase or decrease during the period between t1 and t2. Here, the time interval ($\Delta t$) between t1 and t2 should preferably be set under suitable conditions (e.g., with a predetermined lower limit or a predetermined range for $\Delta t$). Alternatively, $\Delta t$ is set first, and it is determined whether or not the measurement values are monotonically increasing (decreasing) between time t and t+$\Delta t$. If not, t is moved to a suitable time point and set as t1, and t+$\Delta t$ is set as time t2, such that the measurement values monotonically increase (decrease) between t1 and t2.

Next, time points when the measurement value of the target sensor a is the same as that at time t1 are listed up as candidates for time t3 (second starting time) (S604). Similarly, time points when the measurement value of the target sensor a is the same as that at time t2 are listed up as candidates for time t4 (second ending time) (S606).

From all the combinations of the t3 candidates and t4 candidates, the time points that satisfy t4−t3=Δt(=t2−t1) and have a waveform of measurement values therebetween that is similar to the waveform of measurement values between t1 and t2 are set as time t3 and time t4 (S608). t1 to t4 thus determined are shown in FIG. 5.

Next, sensors other than the target sensor a satisfying the following three conditions are determined as being relevant to the target sensor (S610). The first condition is that the measurement values are equal at time t1 and time t3. The second condition is that the measurement values are equal at time t2 and time t4. The third condition is that the waveform of measurement values between t1 and t2 is the same as the waveform of measurement values between t3 and t4. Whether or not the waveform of measurement values between t1 and t2 is the same as the waveform of measurement values between t3 and t4 can be determined by comparing the sensor information during both periods. Similar effects can be expected with only the conditions of measurement values being equal at t1 and t3 and at t2 and t4 and without the condition of the waveform of measurement values being the same during both periods. However, by confirming that both periods have the same measurement waveform, the precision will be higher.

Referring to FIG. 5, of sensors b to e, only sensor d satisfies the three conditions. It therefore shows that sensor d is relevant to sensor a. As can be seen from the way how the sensor is determined as described above, these two sensors are relevant to each other, so that it can also be said that sensor a is relevant to sensor d. Search for relevant sensors at step S404 (FIG. 4) is thus finished as described above. While only one sensor is determined to be relevant to sensor a here, a plurality of sensors may be determined as being relevant.

Statistical processing is performed to the stored data of the sensors determined to be relevant to obtain relational expressions of information of these sensors. That is, relational expressions, with which information of the target sensor can be estimated from the information of the sensors relevant to this sensor, are determined. Any of conventional techniques for estimating missing data may be employed.

Referring back to FIG. 4, a sensor group (or just one sensor) specified as being relevant to the target sensor from the results of relevance search is stored in the sensor information estimation unit 2 (S406). The information stored in the sensor information estimation unit 2 is provided to other nodes via the coordination unit 6 (S408).

Once relevance search is finished with respect to one sensor, it is determined if there is any in the sensors belonging to the node for which the search has not been conducted yet. If there is one, search is conducted similarly for that sensor.

If information on relevant sensors is received from other nodes via the coordination unit 6 (S410: YES), that information is stored in the sensor information estimation unit 2 (S412).

The nodes in the system can thus realize which sensor (s) is/are relevant to each of all the sensors in the system.

3. Sensor Information Acquisition Process

Figure 7A:
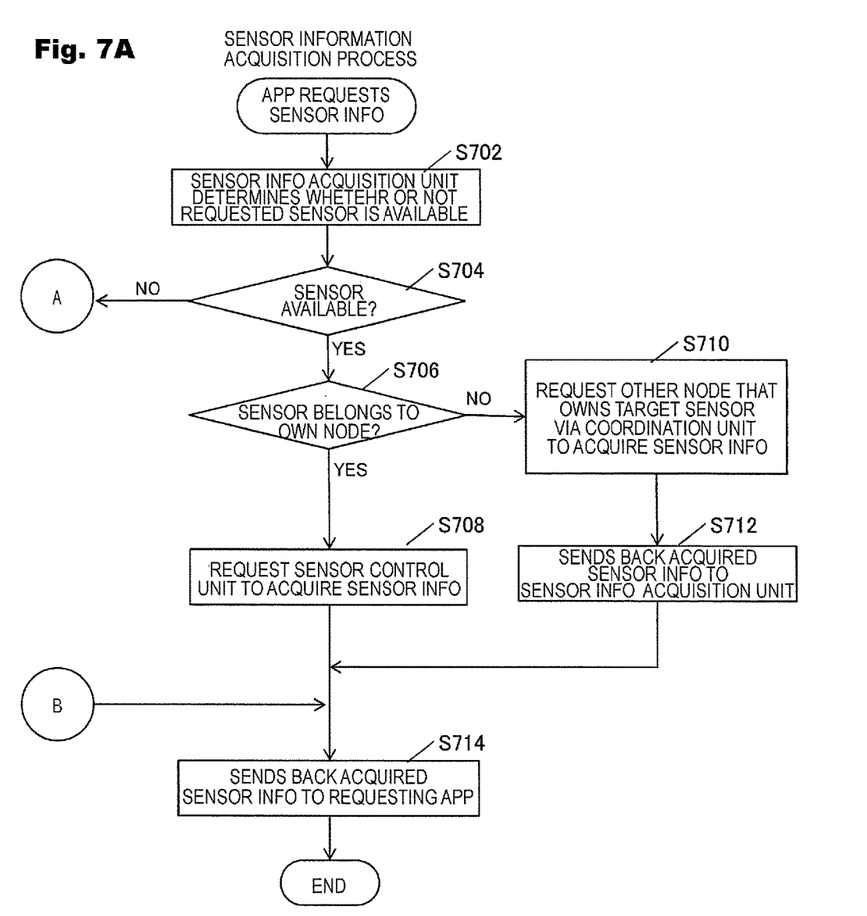
FIG. 7A is a flowchart of a process performed when sensor information is requested.
Figure 7B:
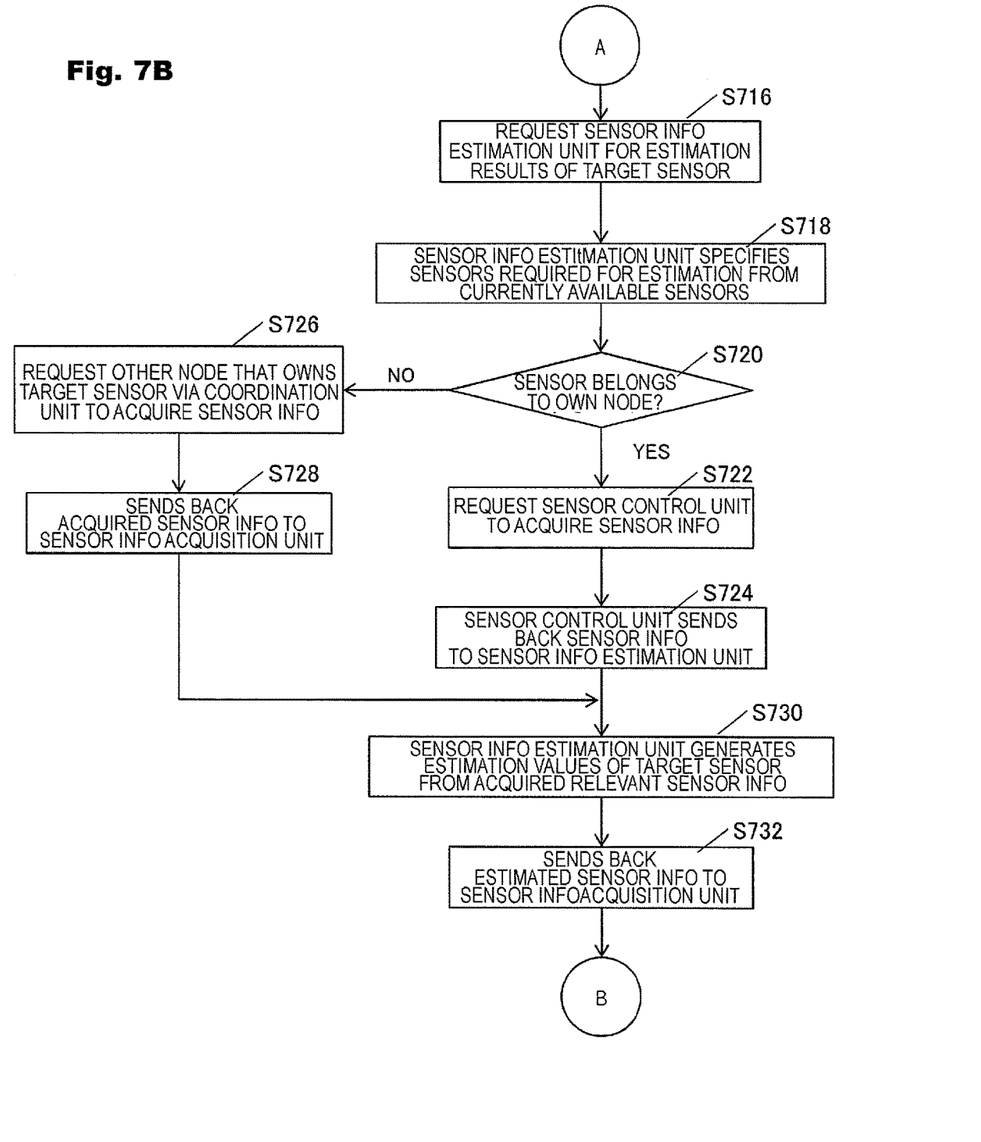
FIG. 7B is a flowchart of a process performed when sensor information is requested.

Next, the process performed when an application program or the like requests acquisition of sensor information will be described with reference to FIG. 7A and FIG. 7B. When an application program requests the sensor information acquisition unit 1 to acquire sensor information, the sensor information acquisition unit 1 determines whether or not the requested sensor is available (S702). The sensor information acquisition unit 1 can recognize whether or not each sensor is available by the sensor information collection process described above.

Figure 8:
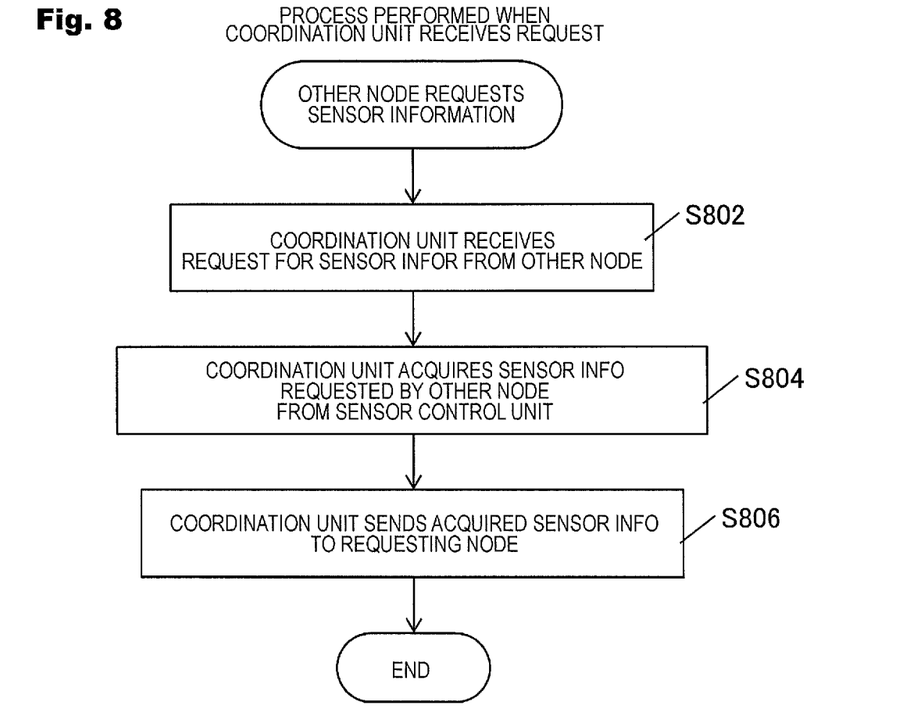
FIG. 8 is a flowchart of a process performed when sensor information is requested from other nodes.

If the requested sensor is available (S704: YES), and if that sensor belongs to its own node (S706: YES), then the unit requests the sensor control unit 5 of its own node to acquire sensor information (S708). If the sensor belongs to other node (S706: NO), the unit requests the other node that has the target sensor via the coordination unit 6 to acquire sensor information (S710, S712). The process carried out when acquisition of sensor information is requested from another node is shown in FIG. 8. When the coordination unit 6 receives a request for sensor information from another node (S802), it acquires information of the requested sensor from the sensor control unit 5 (S804), and sends this sensor information to the requesting node via the coordination unit 6 (S806).

The sensor information acquisition unit 1 thus acquires requested sensor information and sends the sensor information to the requesting application program (S714).

If the requested sensor is unavailable (S704: NO), the sensor information acquisition unit 1 requests the sensor information estimation unit 2 to estimate information of the target sensor (S716). The sensor information estimation unit 2 specifies sensor(s) required for estimating the information of the requested sensor (S718). Sensors that are required for estimation are the sensors that are currently available, in the group of sensors determined to be relevant to the target sensor by the relevant sensor selection process described in the foregoing.

If the sensor thus specified belongs to its own node (S720: YES), the sensor information acquisition unit 1 requests the sensor control unit 5 to acquire sensor information to acquire the information of that sensor (S722, S724). On the other hand, if the sensor thus specified belongs to other node (S720: NO), the sensor information acquisition unit 1 requests the node that owns the sensor via the coordination unit 6 to acquire sensor information, to acquire the information of that sensor (S726, S728).

The sensor information estimation unit 2 estimates the information of the target sensor from the information of the sensors relevant to the requested sensor (S730). With the relational expressions of information of the target sensor and sensors relevant to it, the information of the target sensor can be estimated, by using the relational expressions. Alternatively, the sensor information estimation unit 2 may estimate the current sensor value of the target sensor by referring to the sensor information storage unit 4 and using a multiple imputation method or the like.

The sensor information estimation unit 2 sends back the sensor information thus estimated to the sensor information acquisition unit 1 (S732). The sensor information acquisition unit 1 sends back the estimated values to the requesting application program as the information of the requested sensor (S714).

Effects of this Embodiment

In this embodiment, sensor information is acquired regularly from each sensor, and the numbers of sensors in respective groups of sensors relevant to each sensor are narrowed down based on the information. If there is an unavailable sensor and its information need to be estimated, this is done based on the information of minimum necessary number of relevant sensors, instead of using the information of all the sensors. Therefore, the amount of sensor information that needs to be acquired to estimate desired sensor information is small, so that the time necessary for the estimation is reduced. Another advantage is that more precise estimation is possible because information of irrelevant sensors is not used as parameters for the estimation.

Variation Example

Figure 9:
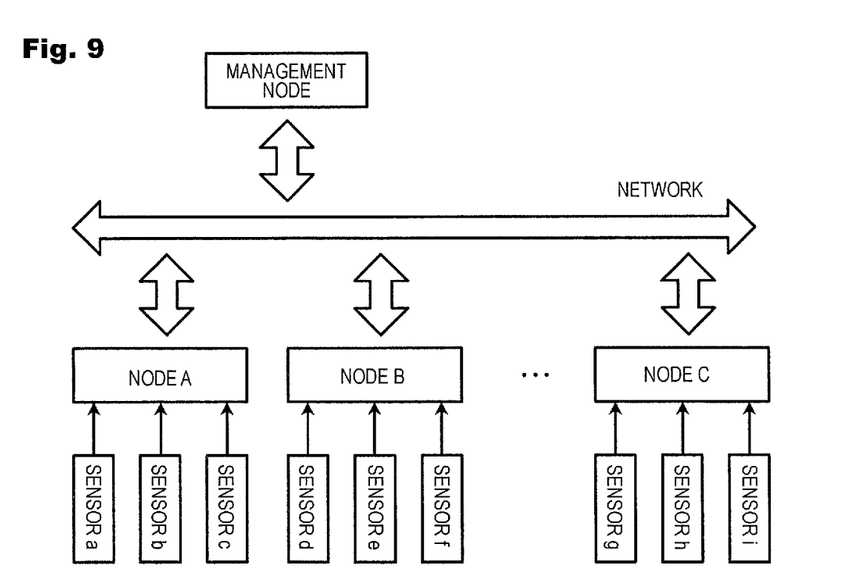
FIG. 9 is a diagram illustrating the general configuration of a data complementing system according to a variation example.
Figure 10:
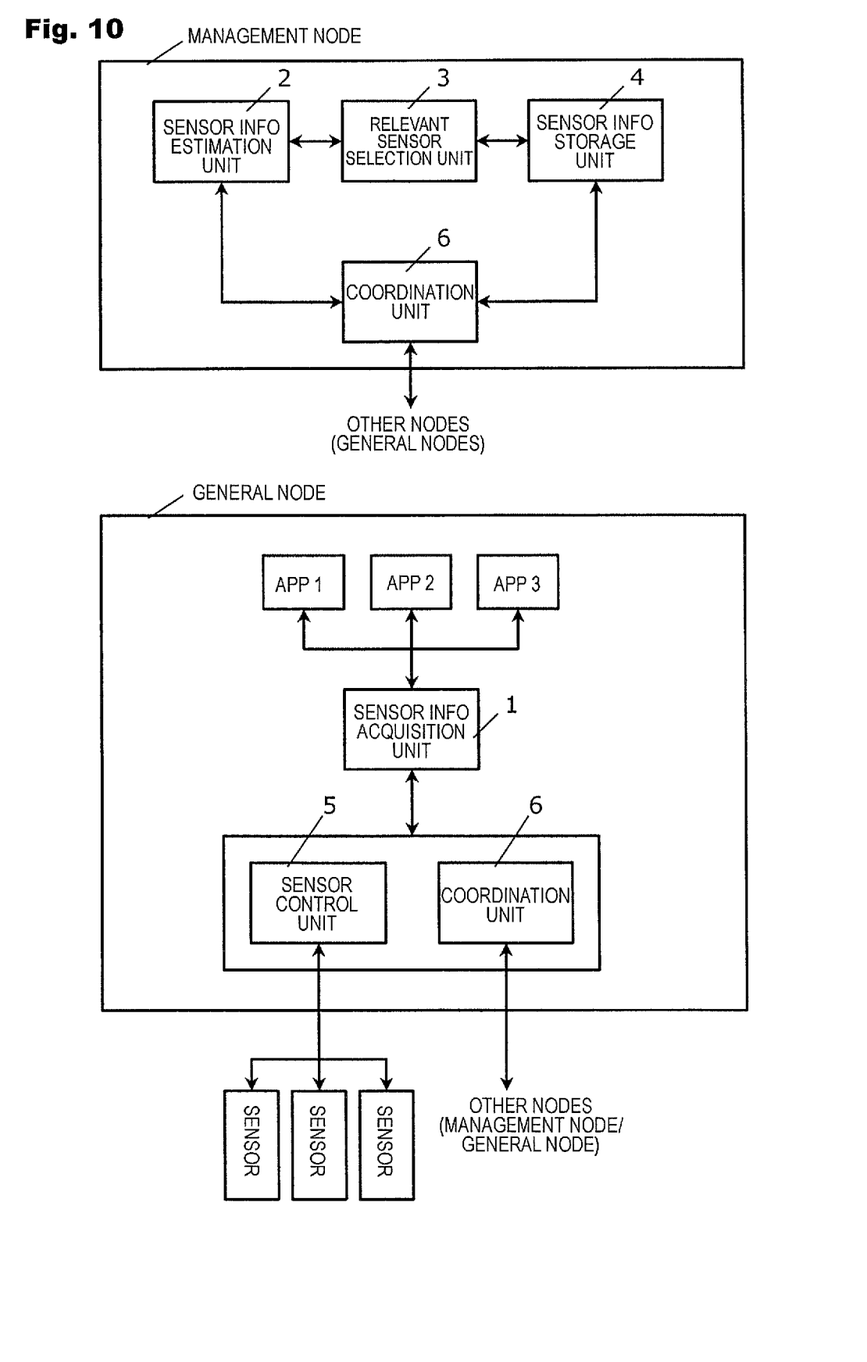
FIG. 10 is a diagram illustrating functional blocks of general nodes and a management node in the variation example.

While all the nodes have the same functions in the example described above, the specifics of the system configuration need not be limited to those of the example described above. For example, a management node that is dedicated to the processes of storing sensor information, selecting relevant sensors, and estimating sensor information may be employed. FIG. 9 shows the system configuration diagram according to this variation example. FIG. 10 shows functional blocks of a management node and general nodes according to this variation example.

In this example, the management node includes a sensor information estimation unit 2, a relevant sensor selection unit 3, a sensor information storage unit 4, and a coordination unit 6. The general nodes, on the other hand, include a sensor information acquisition unit 1, a sensor control unit 5, and a coordination unit 6.

In this example, the general nodes regularly acquire information of sensors belonging to its own node and provides the information to the management node via the coordination unit 6. The regularly acquired information of the sensors in the system is stored in the sensor information storage unit 4 of the management node. The relevant sensor selection unit 3 of the management node examines the relevance between the sensors based on the stored information.

When an application program requests a general node to acquire sensor information, if the sensor is of its own node and if it is available, the sensor control unit 5 of the node acquires the sensor information. If the requested sensor is unavailable, the node requests the management node to estimate the sensor information. If the requested sensor belongs to other node, the information may be acquired via the management node, or directly from the node that owns that sensor.

This way, with a processor having a large computing capacity employed for the management node, high-speed processing is possible. Since the amount of data processed by general nodes is not significantly increased, no excessive load is added to the general nodes.

A person skilled in the art would readily infer various other configuration examples of such a system to which a plurality of computers are connected, with the processes assigned differently as required. For example, the management node itself may own sensors so that it functions also as a general node. A configuration that employs two or more such management nodes would also be possible. It would also be apparent that this system is not necessarily configured with a plurality of computers but such system can be configured in one computer to achieve the same effects.

REFERENCE SIGNS LIST 1 sensor information acquisition unit
2 sensor information estimation unit
3 relevant sensor selection unit
4 sensor information storage unit
5 sensor control unit
6 coordination unit

The invention claimed is:

1. A sensor information complementing system, comprising:
   a plurality of sensors, which are communicatively connected via a network in a vehicular system;
   a processor configured to:
      acquire sensor information from the plurality of sensors;
      store sensor information regularly acquired from the plurality of sensors;
      compare the stored information from one sensor of the plurality of sensors with stored information from the other sensors of the plurality sensors and determine which one or more other sensors of the plurality of sensors are correlated to the one sensor, the one or more other sensors being determined to correlate to the one sensor in response to measurement values of the one or more other sensors at a plurality of selected times being equal to measurement values of the one sensor at the plurality of selected times;
      acquire actual sensor information of a target sensor of the plurality of sensors in response to a determination that the target sensor is available; and
      acquire estimated sensor information of the target sensor of the plurality of sensors in response to a determination that the target sensor is unavailable so as to ensure acquiring of sensor information of the target sensor even when the target sensor is unavailable, the unavailable target sensor being the one sensor of the plurality of sensors, and the estimated sensor information being sensor information of the one or more other sensors of the plurality of sensors determined to correlate to the one sensor.

2. The sensor information complementing system according to claim 1, wherein the system is configured by a plurality of nodes each including at least one of the plurality of sensors, and the processor for exchanging information with other nodes,
   the processor is capable of acquiring sensor information of a sensor belonging to another node from the another node and of providing sensor information of a sensor belonging to its own node to another node, and provides, to the another node, sensor information of a sensor belonging to its own node regularly acquired by the processor,
   the processor stores sensor information regularly acquired from a sensor belonging to its own node and from a sensor belonging to another node, and
   if another sensor correlated to the target sensor belongs to another node, the processor acquires sensor information of the another sensor to estimate sensor information of the target sensor.

3. The sensor information complementing system according to claim 2, wherein the processor determines other sensors correlated to the sensors belonging to its own node.

4. The sensor information complementing system according to claim 1, wherein the system is configured by:
   a plurality of general nodes each including at least one sensor, and the processor for exchanging information with other nodes; and
   a management node including the processor for exchanging information with other nodes,
   the processor of each of the general nodes is capable of acquiring sensor information of sensors belonging to other general nodes from the other general nodes or the management node and of providing sensor information of sensors belonging to their own nodes to the other general nodes or the management node, the plurality of general nodes regularly acquire sensor information from the sensors belonging to their own nodes and provide the sensor information to the management node via the processor, and the processor of the management node acquires sensor information of other sensors correlated to the target sensor from the nodes to which the other sensors belong to estimate sensor information of the target sensor.

5. The sensor information complementing system according to claim 1, wherein the processor:

determines a first starting time and a first ending time based on the stored sensor information of the one sensor of the plurality of sensors such that sensor values of the one sensor monotonically increase or decrease between the first starting time and the first ending time;

determines candidates of a second starting time which is a different time point at which the sensor value of the one sensor equals to the sensor value at the first starting time;

determines candidates of a second ending time which is a different time point at which the sensor value of the one sensor equals to the sensor value at the first ending time;

determines a second starting time and a second ending time from the second starting time candidates and the second ending time candidates such that difference over time between the second starting time and the second ending time is the same as that between the first starting time and the first ending time; and determines that the one or more other sensors of the plurality of sensors is correlated to the one sensor if the sensor information at the first starting time is equal to the sensor information at the second starting time and if the sensor information at the first ending time is equal to the sensor information at the second ending time.

6. The sensor information complementing system according to claim 2, wherein the processor:

determines a first starting time and a first ending time based on the stored sensor information of the one sensor of the plurality of sensors such that sensor values of the one sensor monotonically increase or decrease between the first starting time and the first ending time;

determines candidates of a second starting time which is a different time point at which the sensor value of the one sensor equals to the sensor value at the first starting time;

determines candidates of a second ending time which is a different time point at which the sensor value of the one sensor equals to the sensor value at the first ending time;

determines a second starting time and a second ending time from the second starting time candidates and the second ending time candidates such that difference over time between the second starting time and the second ending time is the same as that between the first starting time and the first ending time; and determines that the one or more other sensors of the plurality of sensors is correlated to the one sensor if the sensor information at the first starting time is equal to the sensor information at the second starting time and if the sensor information at the first ending time is equal to the sensor information at the second ending time.

7. The sensor information complementing system according to claim 3, wherein the processor:

determines a first starting time and a first ending time based on the stored sensor information of the one sensor of the plurality of sensors such that sensor values of the one sensor monotonically increase or decrease between the first starting time and the first ending time;

determines candidates of a second starting time which is a different time point at which the sensor value of the one sensor equals to the sensor value at the first starting time;

determines candidates of a second ending time which is a different time point at which the sensor value of the one sensor equals to the sensor value at the first ending time;

determines a second starting time and a second ending time from the second starting time candidates and the second ending time candidates such that difference over time between the second starting time and the second ending time is the same as that between the first starting time and the first ending time; and determines that the one or more other sensors of the plurality of sensors is correlated to the one sensor if the sensor information at the first starting time is equal to the sensor information at the second starting time and if the sensor information at the first ending time is equal to the sensor information at the second ending time.

8. The sensor information complementing system according to claim 4, wherein the processor:

determines a first starting time and a first ending time based on the stored sensor information of the one sensor of the plurality of sensors such that sensor values of the one sensor monotonically increase or decrease between the first starting time and the first ending time;

determines candidates of a second starting time which is a different time point at which the sensor value of the one sensor equals to the sensor value at the first starting time;

determines candidates of a second ending time which is a different time point at which the sensor value of the one sensor equals to the sensor value at the first ending time;

determines a second starting time and a second ending time from the second starting time candidates and the second ending time candidates such that difference over time between the second starting time and the second ending time is the same as that between the first starting time and the first ending time; and determines that the one or more other sensors of the plurality of sensors is correlated to the one sensor if the sensor information at the first starting time is equal to the sensor information at the second starting time and if the sensor information at the first ending time is equal to the sensor information at the second ending time.

9. A sensor information complementing method for estimating, in a system having a plurality of sensors which are communicatively connected via a network in a vehicular system, sensor information of a specific sensor on the basis of sensor information of other sensors of the plurality of sensors when the sensor information is unavailable from the specific sensor, the method comprising the steps of:

regularly acquiring sensor information from the plurality of sensors and storing the sensor information;

comparing the stored information from one sensor of the plurality of sensors with stored information from the other sensors of the plurality sensors and determining which one or more other sensors of the plurality of sensors are correlated to the one sensor, the one or more other sensors being determined to correlate to the one sensor in response to measurement values of the one or more other sensors at a plurality of selected times being equal to measurement values of the one sensor at the plurality of selected times;

acquiring actual sensor information of a target sensor of the plurality of sensors in response to a determination that the target sensor is available; and acquiring estimated sensor information of the target sensor of the plurality of sensors in response to a determination that the target sensor is unavailable so as to ensure acquiring of sensor information of the target sensor even when the target sensor is unavailable, the unavailable target sensor being the one sensor of the plurality of sensors, and the estimated sensor information being sensor information of the one or more other sensors of the plurality of sensors determined to correlate to the one sensor.

10. The sensor information complementing method according to claim 9, wherein in the selecting step, a first starting time and a first ending time are determined based on the stored sensor information of the one sensor of the plurality of sensors such that sensor values of the one sensor monotonically increase or decrease between the first starting time and the first ending time, candidates of a second starting time which is a different time point at which the sensor value of the one sensor equals to the sensor value at the first starting time are determined, candidates of a second ending time which is a different time point at which the sensor value of the one sensor equals to the sensor value at the first ending time are determined, a second starting time and a second ending time are determined from the second starting time candidates and the second ending time candidates such that difference over time between the second starting time and the second ending time is the same as that between the first starting time and the first ending time, and it is determined that the one or more other sensors of the plurality of sensors is correlated to the one sensor if the sensor information at the first starting time is equal to the sensor information at the second starting time and if the sensor information at the first ending time is equal to the sensor information at the second ending time.

* * * * *